United States Patent [19]

Croft et al.

[11] 4,383,956
[45] May 17, 1983

[54] METHOD OF A SINGLE ELEMENT COMPLETE AIR FILTERING STRUCTURE FOR A RESPIRATOR FILTER CARTRIDGE

[75] Inventors: George T. Croft, Fiskdale; Richard J. Hovey, Sturbridge, both of Mass.

[73] Assignee: American Optical Corporation, Southbridge, Mass.

[21] Appl. No.: 230,132

[22] Filed: Jan. 30, 1981

[51] Int. Cl.³ .................. B29D 27/00; B01D 39/14; B01D 53/14; B01J 20/04
[52] U.S. Cl. ................................ 264/49; 55/524; 264/54
[58] Field of Search .................. 264/49, 54; 55/524

[56] References Cited

U.S. PATENT DOCUMENTS

| | | | |
|---|---|---|---|
| 1,537,519 | 5/1925 | Yablick . | |
| 3,131,426 | 5/1964 | Legler | 264/54 X |
| 3,190,842 | 6/1965 | Ringwood et al. | 264/54 X |
| 3,228,896 | 1/1966 | Canterino et al. | 264/49 |
| 3,253,542 | 5/1966 | McDonough | 264/49 X |
| 3,329,759 | 7/1967 | Rice | 264/321 |
| 3,389,198 | 6/1968 | Taber | 264/54 X |
| 3,489,507 | 1/1970 | Gardner et al. | 55/74 X |
| 3,496,266 | 2/1970 | Fairbanks | 264/54 X |
| 3,577,359 | 5/1971 | Carevic et al. | 264/321 X |
| 3,762,134 | 10/1973 | St. Cyr et al. | 55/524 X |
| 3,919,369 | 11/1975 | Holden | 264/54 X |
| 3,925,021 | 12/1975 | Yoshino et al. | 55/524 X |
| 3,956,020 | 5/1976 | Weininger et al. | 264/49 X |
| 3,966,440 | 6/1976 | Roberts . | |
| 4,046,939 | 9/1977 | Hart | 55/524 X |
| 4,046,942 | 9/1977 | van Wersch | 264/49 X |
| 4,093,422 | 6/1978 | Hain | 55/524 X |
| 4,154,586 | 5/1979 | Jones et al. . | |
| 4,220,633 | 9/1980 | Pirsh | 55/524 X |
| 4,227,904 | 10/1980 | Kasmark et al. | 55/524 X |

Primary Examiner—Philip E. Anderson
Attorney, Agent, or Firm—Kenway & Jenney

[57] ABSTRACT

A respirator filter formed of a cast polymeric matrix having a controlled porosity and inclusion of toxic gas absorbing and/or neutralizing chemicals. The chemicals are introduced into the casting precursor or added after polymerization, e.g. by imbibition with a solvent carrier and deposition by solvent evaporation.

5 Claims, 5 Drawing Figures

METHOD OF A SINGLE ELEMENT COMPLETE AIR FILTERING STRUCTURE FOR A RESPIRATOR FILTER CARTRIDGE

BACKGROUND OF THE INVENTION

1. Field of the Invention

This invention relates to respirator filters and has particular reference to improvements in filtering components for cartridges or canisters used in respirator systems.

2. Discussion of the Prior Art

Respirators and gas masks are traditionally provided with replaceable air-filtering cartridges or canisters containing granular fillers, pads of felt and/or variously formed and arranged mats of synethetic or natural fibers. Typical cartridges employ a combination of two or more of the above. U.S. Pat. Nos. 1,537,519; 3,489,507; 3,966,440; and 4,154,586 are exemplary.

Difficulties in accomplishing and maintaining standardization of each and all of several prior art filtering materials, their high cost and tediousness of fabrication and assembly in receiving shells or canisters all, to say the least, illustrate a long-standing need for improvement, i.e. improvements are needed in materials and methods of manufacture as well as end product effectiveness.

Accordingly, the present invention has an objective of overcoming the shortcomings of prior art respirator cartridges or canisters by provision of an improved filtering system having an adaptability to present cartridge or canister shells and versatility to future respirator design.

More particularly, an object of the invention is to provide a complete air filtering system for respirator cartridge shells or canisters in single element form; and Still another object is to render the single element air filtering system readily and economically customized to existing cartridge or canister shell configurations or to other contemplated shapes.

Other objects and advantages of the invention will become more readily apparent from the following description.

SUMMARY OF THE INVENTION

Objects and advantages of the invention are accomplished by casting a filter component to a particular shape, size and cross-sectional configuration using a fully polymerized or polymerizable casting precursor containing a dispersion of leachable particulate matter. Leaching after casting, and polymerization when necessary, provides the open pore filter structure. A similar open pore structure may be obtained with blowing agents in the casting matrix. Toxic gas absorbing and/or neutralizing chemicals may be introduced into the casting precursor for permanent dispersion and exposure in the final open pore structure or similar chemicals may be added after formation of the open pore structure, e.g. by imbibition with a solvent carrier and deposition by solvent evaporation.

Details of the invention will become more readily apparent from the following description when taken in conjunction with the accompanying drawings.

IN THE DRAWINGS

DESCRIPTION OF THE PREFERRED EMBODIMENTS

This invention deals with cast open pore respirator filters more particularly in single element form and containing toxic gas neutralizing and/or absorbing means.

Figure 1:
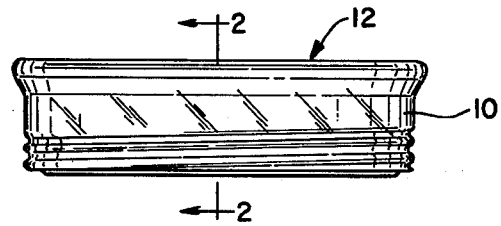
FIG. 1 is a side view of a respirator cartridge which exemplifies one of several forms of devices to which the present invention is applicable.
Figure 2:
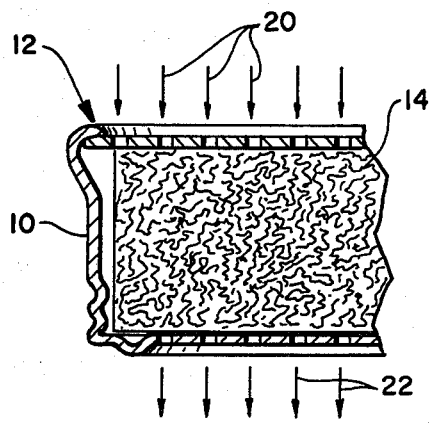
FIG. 2 is an enlarged fragmentary cross-sectional view of the cartridge taken approximately along line 2—2 of FIG. 1 illustrating an embodiment of the invention.

Shell 10 of respirator cartridge 12 (FIGS. 1-3) is exemplary of a receiving item for a filter produced according to the invention and one such filter 14 is illustrated in FIG. 2.

Filter 14 is cast to the illustrated right cylindrical configuration using a polymeric system capable of being generated in a cellular (porous) form. Polyvinylchloride, polyethylene, cellulose esters, silicones, epoxies, polyurethane and polystyrene are exemplary materials.

The cellular structure of filter 14 is formed by fusing a fully formed polymer with a blowing agent, e.g. sodium carbonate or bicarbonate, or with leachable additives. Such additives which are non-reactive with the plastic matrix particularly at molding temperatures (e.g. of from 300° F. to 400° F.) are sodium sulphate when used with cellulose and zinc sterate, talc or starch when used with polyethylene or polyvinylchloride. Particle size may range from $0.1\mu$ to 1 mm in concentrations of from 10% to 75% in the matrix.

Filter casting molds, not illustrated herein, would typically have a molding cavity of a shape and size corresponding to the internal shape and size of cartridge shells intended to receive the cast filters.

A filter 14 casting precursor containing a blowing agent or leachable additive is, according to one aspect of the invention, further provided with substantially uniformly distributed toxic gas neutralizing chemicals. Sodium carbonate may be used for neutralized HCL gas or $SO_2$, ferric chloride will trap hydrogen sulfide ($H_2S$) and cupric chloride may be used to complex ammonia and methylamine. The expression "neutralizing", in the sense of chemical interaction, is herein intended to include absorption and/or other forms of filtering or blocking of toxic gasses, mists or aerosols in respirator cartridges.

Suitable concentrations of gas neutralizing chemicals are from 0.5% to 10% in the filter 14 matrix at particle sizes between $0.5\mu$ and 0.1 mm.

Following casting and fusing of a filter 14 matrix having leachable additives, (e.g. at molding temperatures of from 300° F. to 400° F. for 1 to 3 minutes), removal of the additives by leaching produces the open pore structure. Since the selected leaching solvent should not chemically interact with the filter 14 matrix, water and alcohols are preferred agents. Immersion of the matrix in the selected leaching solvent, preferably with agitation of either or both, will produce desirable results.

Figure 4:
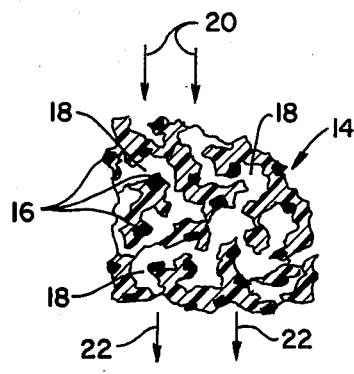
FIG. 4 is a greatly enlarged fragmentary cross-sectional view of one form of a filter component produced according to the invention.

FIG. 4 illustrates, in enlarged cross-section, the cellular structure of filter 14 resulting from inclusion of particles 16 of gas neutralizing chemicals. The particles are at least partially exposed in pores 18 of the structure, i.e. in direct contact with gasses indicated by arrows 20 and 22, (FIG. 2) passing through the open pore structure.

As already mentioned, the invention also contemplates the positioning of gas neutralizing chemicals after formation of the cellular matrix, i.e. by imbibition with a solvent carrier and deposition by solvent evaporation.

Figure 5:
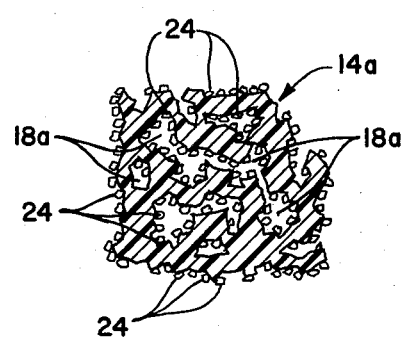
FIG. 5 is a similarly greatly enlarged fragmentary section of an alternative form of the invention.

This is illustrated in FIG. 5 wherein a crystallization of gas neutralizing chemicals is shown in porosities 18a of filter 14a. In this case, using one or more of the above chemicals in solvent carriers of water, methanol, ethanol, acetone or mixtures thereof as a bath, the preformed cellular matrix is imbibed in or charged with the solvent mixture until porosities 18a are at least substantially filled. Subsequent evaporation of the solvent will then provide a substantially uniform distribution of the gas neutralizing chemicals in the filter 14a structure. These chemicals will take the form of microcrystals 24 with rapid solvent evaporation which may be accomplished by selection of solvents of high volatility and/or heating of the filter matrix.

Figure 3:
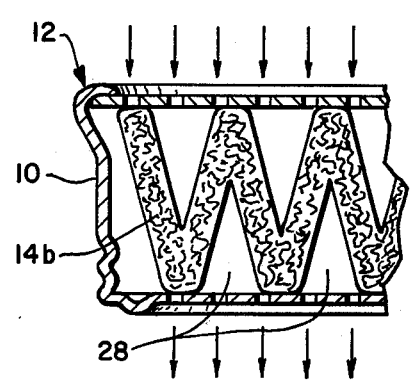
FIG. 3 illustrates a modification of the invention.

Filters 14 or 14a need not be in the solid block, form shown in FIGS. 2, 4 and 5. The filter matrix may be molded or cast to various cross-sectional shapes affording greater gas receiving surface area. One such configuration is illustrated in FIG. 3, i.e. filter 14b, having the cellular structure of either FIG. 4 or FIG. 5, provides a gas receiving surface extending along each depending V-shaped segment. It should be understood that the inverted V-shaped openings 28 may be omitted for provision of a greater final filtering mass. Other shapes, e.g. resembling prior art spiraled or pleated components may be used. Also, while the foregoing describes single element (one piece) filters, it should be understood that these may be used in pairs or other multiples in respirator or gas mask canisters.

Those skilled in the art will readily appreciate that other modifications or adaptations of the invention may be made to suit particular requirements and that all which incorporate the present concept are to be construed as coming within the scope of the following claims or the range of equivalency to which they are entitled. 9n

What is claimed is:

1. The method of making a single element complete air filtering structure for a respirator filter cartridge comprising the steps of:
   preparing a casting precursor of polymeric material and including in said casting precursor a leachable additive;
   casting said precursor to a shape and size desired of said single element structure;
   leaching said leachable additive from said material to form an open pore matrix structure; and
   introducing a toxic gas neutralizing agent into said matrix structure prior to or subsequent to casting and leaching.

2. The method according to claim 1 wherein said gas neutralizing agent is introduced into said casting precursor.

3. The method of claim 1 wherein said gas neutralizing agent is deposited in said open pores of said filter structure subsequent to said casting and leaching of said matrix structure forming material.

4. The method of claim 2 wherein said gas neutralizing means is in particle form.

5. The method according to claim 3 wherein said gas neutralizing agent is initially in solution with a solvent and caused to become imbibed by said porous matrix for deposit therein by evaporation of said solvent.

* * * * *